United States Patent

Gozzano et al.

[11] 3,939,340
[45] Feb. 17, 1976

[54] DIFFUSED LIGHT REFLECTING SCREEN FOR TAKING PHOTOS AND THE LIKE

[76] Inventors: Renato Gozzano, Via Quarnero 14, Milan; Santino Martinelli, Via S. Pietro 37, Bollate, both of Italy

[22] Filed: Aug. 14, 1974

[21] Appl. No.: 497,238

[30] Foreign Application Priority Data

Aug. 27, 1973   Italy................................... 52183/73

[52] U.S. Cl............................. 240/103 R; 240/1.3
[51] Int. Cl.². ........................................... F21V 7/00
[58] Field of Search................ 240/1.3, 41.1, 103 R

[56] References Cited
UNITED STATES PATENTS

| | | | |
|---|---|---|---|
| 1,225,261 | 5/1917 | McCandless | 240/1.3 X |
| 3,294,962 | 12/1966 | Hilzen | 240/41.1 X |
| 3,712,978 | 1/1973 | Lowell | 240/1.3 |

Primary Examiner—Monroe H. Hayes
Attorney, Agent, or Firm—Laurence, Stokes & Neilan

[57] ABSTRACT

A foldable reflecting screen for taking photos and the like comprising a carrying skeleton defining an inner space of parabolic cross section having a base rectangular frame and which is formed of members which are articulated to each other and of members which can be connected to each other by disengageable means so that the skeleton components can be partly disassembled and partly folded so as to occupy a minimum space or according to an opposite sequence of operations can be brought in their use position, and of an outer covering which comprises a first portion made of flexible, opaque sheet material having a white inner surface and a dark outer surface and designed to cover the parabolic surface defined by said skeleton, and a second portion made of translucent flexible material to screen the rectangular base of said skeleton and which is at least disconnectably connected with the first portion along their edges said base frame comprising two side rods and cross members, near the ends of said longitudinal rods of the rectangular frame and at least on one intermediate point first fittings being provided to disassemblably receive the ends of said cross members and other fittings to disassemblably receive the ends of curved centering parabolic rods.

5 Claims, 3 Drawing Figures

DIFFUSED LIGHT REFLECTING SCREEN FOR TAKING PHOTOS AND THE LIKE

The present invention relates to a diffused light reflecting screen to obtain light effects, as photos and the like have to be taken, said screen being able to be rapidly folded so as to occupy a minimum space and can be also easily unfolded to be brought in its use condition. Said device is substantially constituted of a partially foldable and partially disassemblable skeleton, and of flexible covering wall which is made of plastics, preferably an opaque fabric of synthetic fibres having an inner white surface and an outer dark surface, while the wall or screen through which pass the rays of light supplied from at least one inner source is translucent, or opaline so as to transmit a diffused light therethrough.

The carrying structure or supporting skeleton comprises a rectangular base frame, the longitudinal sides of which are each constituted of a single rod and connected to the another by composite cross members i.e. two end cross members and at least one intermediate cross member, all said cross members being formed of at least three sections, the central section of which is disassemblably connected to the end sections. Said skeleton also comprises a central upper longitudinal beam on which two sliding bodies are slidably mounted, which are each connected respectively to the ends of the two longitudinal rods of the base frame by means of a pair of double-hinged arms, the axes of said hinges being so positioned as to allow the corresponding sliding body to slide along the longitudinal central beam so as to cause the two longitudinal rods to move one towards the other, after the intermediate sections of the cross members having been disassembled so that the said skeleton can be folded so as to occupy a minimum space and in this folded condition it may be easily transported or stored, or according to an opposite sequence of operations, the longitudinal rods can be moved away from one another up to attain their predetermined spacing. At the points where the end sections of the cross members are connected to the longitudinal rods guiding and fitting means are provided to receive the ends of curved centering rods the ends of which can be locked by spring locking means and which define together with the base frame an inner space having a parabolic cross section and which is closed by a covering wall made of an opaque, flexible sheet material having a white inner surface and a, preferably, black outer surface. Said space is thus defined by a reflecting surface of a conventional parabolic shape, on the focal line of which at least a lamp is removably mounted which can be supported, through suitable means, by the central upper beam. On the contrary the lower opening of said cavity is closed by a translucent flexible sheet releasably attached to at least three of the peripheral edges of the covering by means of releasable connecting means.

This invention provides a foldable reflecting device which can be assembled by any unskilled person without the use of any tool and which can be also readily disassembled.

The accompanying drawings show, merely by way of example and without limiting the invention, an embodiment thereof; in the drawings.

Figure 1:
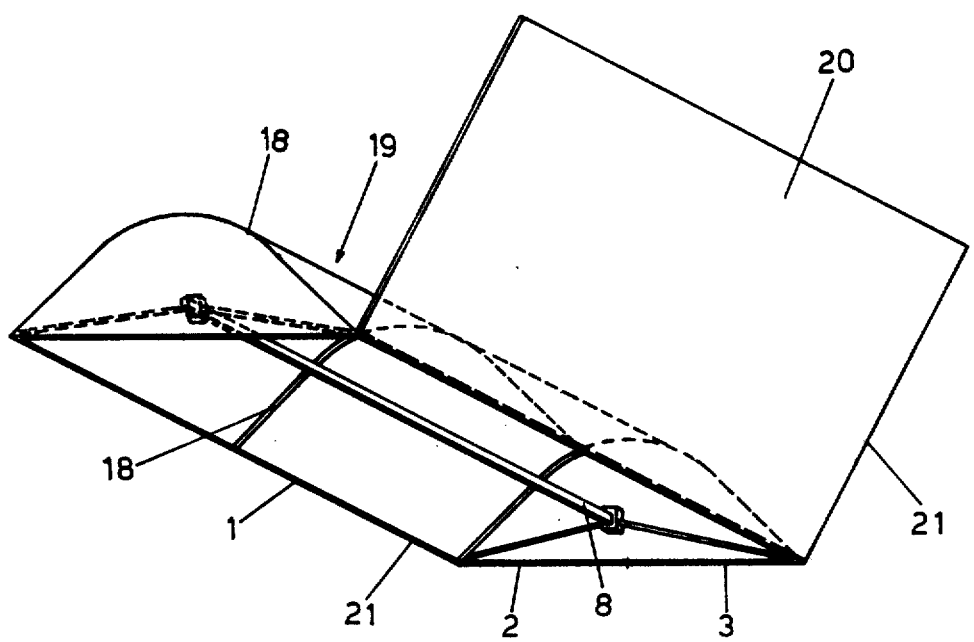
FIG. 1 is a diagrammatic perspective view, taken from below, of the assembled device just before the positioning and locking of the lower translucent screen wall.

Now referring to the drawings at 1 are marked the longitudinal beams or rods which are a part of the carrying skeleton of the reflecting device. At the ends and at least at one intermediate point of each longitudinal rod 1 the end sections 2 of the cross members are fixedly connected which are composed by said end sections 2 and by an intermediate disassemblable section 3. The free ends of the sections 2 and 3 are provided with guiding sleeves 7 and with spring locking means respectively of an adjustable type, which may be, for instance, constituted of a row of notches 4 arranged on the ends of each section 3 and which are designed to cooperate with a locking tooth 5 supported by a strong spring arm 6. Therefore in order to cause the rods 1 to approach one another it is sufficient to disengage each tooth 5 from the notches 4 letting the central section 3 move axially until it can come out of engagement of the corresponding guiding sleeve 7 of one of the end sections 3, and then letting its other end to come out of the other guiding sleeve 7 after having disengaged the tooth 5 from the corresponding locking means 4 of the opposite section 2. As the skeleton is brought in its work position, it is sufficient to insert the ends of the central sections 3 into the sleeves 7 forcing the rods 1 to move away from one another, while the teeth snap pass from a notch 4 to the other, this locking system being performed according to a known solution so that the said locking means 4, 5, 6 enable to readily attain the desired extension of the composite cross members 2, 3 and at the same time they perform a mutual locking of the sections 2 and 3 in their contraction direction, except when it is desired to manually disengage the locking teeth acting against the effect of the springs 6, from their facing notches.

Figure 2:
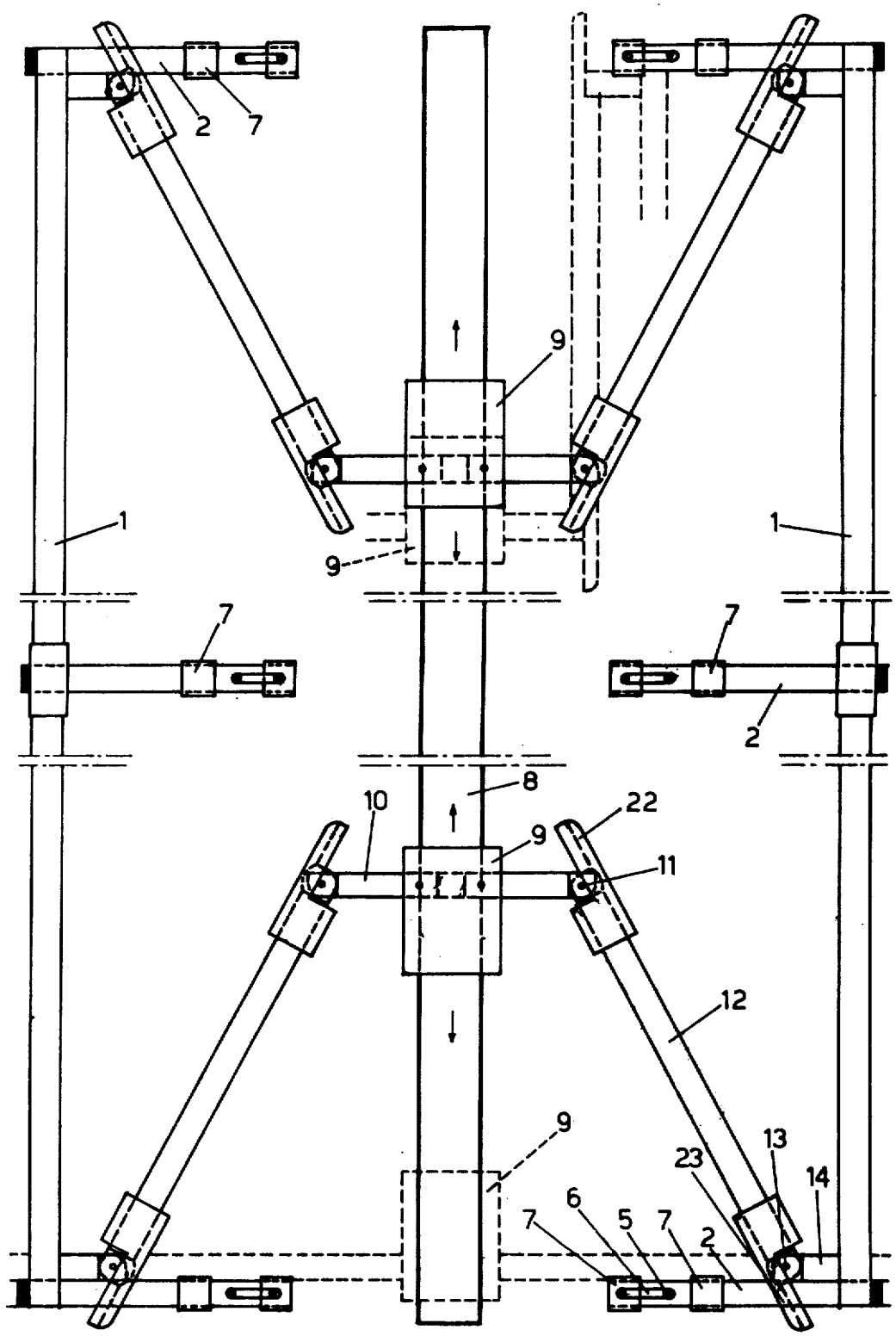
FIG. 2 is a plan view, partly broken away, of the foldable skeleton, as the folding phase is just begun or as the unfolding phase is being to be completed; in this Figure the fittings for the curved centering rods have been omitted.
Figure 3:
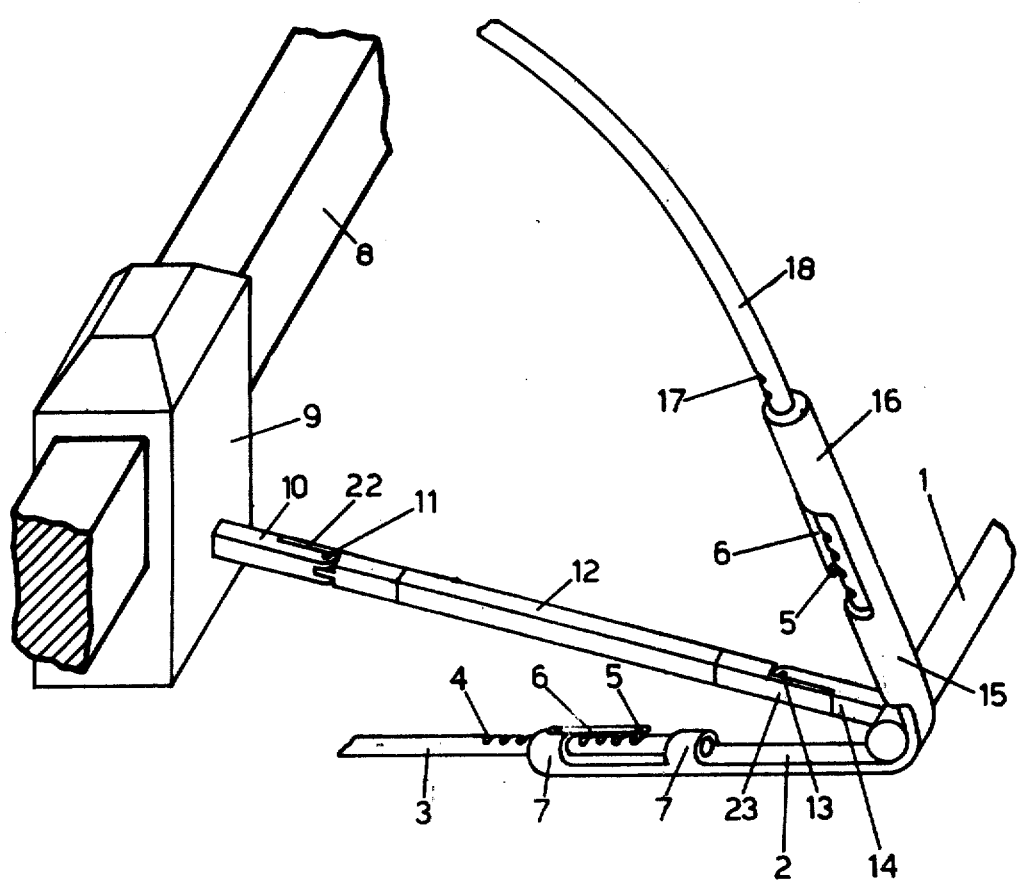
FIG. 3 is a perspective diagrammatic view of the detail of the corner area of the skeleton in its use position.

At 8 is indicated a strong longitudinal beam preferably of a rectangular cross section, and along which are slidably mounted two sliders 9 which are made integral with a pair of short side arms 10, each articulated at 11 to a rod 12 which is in turn, articulated at 13 to another short arm 14 made integral with the end of the corresponding longitudinal rod 1; the pivot axes of the hinges 11 and 13 of each composite arm 10, 12, 14 having a double articulation are parallel to one another and are so inclined to allow the slider 9 to move along the beam 8 which is located at a level higher than that of the rods 1 of the base frame, thus enabling the sections 10, 12 and 14 to pass from their coaxial relationship defined by stop means 22 and 23, as the carrying skeleton of the device of the invention is in its use position (FIGS. 1 and 3 and position of the components shown in broken lines at the lower portion of FIG. 2), to the position wherein the central sections 12 are substantially parallel to the longitudinal rods 1 and to the beam 8, in this position the skeleton occupying the minimum space (see the position of the components shown in broken lines at the upper portion of the FIG. 2). Of course, in the joint points 11 and 13 spherical joints could be also used. At the ends of the longitudinal rods 1, preferably where arms 2 are mounted, and at least on one intermediate point thereof short arms 15 are fixed forming guiding sleeves 16 provided with spring locking means which could be, for instance, constituted, as provided in the connection of each section 3 to the sections 2, of a tooth 5 mounted on an elastic arm 6, said tooth 5 being so positioned as to be able to engage one of a row of facing notches 17 arranged on a curved centering rod 18 so shaped as to define the cross section of the inner space of the reflecting device, i.e. a parabolic cross section.

After the curved rods 18 having been mounted on the base frame which has been brought in its use position, the carrying skeleton of the reflecting device is ready to be used. Then the lamp or lamps are mounted into fittings of a disassemblable type (not shown in the drawings) and the covering will be then applied about said skeleton; said covering could be also permanently connected to at least one of the longitudinal rods 1. Said covering is constituted of a parabolic upper portion 19 made of an opaque sheet material, as fabric and the like, having a white inner surface and a black outer surface and which could be optionally attached to the framework through removable fixing means of any suitable type. The sheet wall 20 designed to close the lower opening of the skeleton is made of a translucent flexible sheet material which could be connected with the covering 19 along one of the rods 1 while along the other sides of said opening closure means 21, could be provided, as zippers or any other equivalent means.

The carrying skeleton is made preferably of a metal lightweight resistant alloy, and is constituted, when possible, of hollow members and with eventual portions made of plastics of a resistant and rigid type, while the covering is preferably made of a flexible plastic material, of fabric or other suitable sheet material.

We claim:

1. A foldable reflecting screen for taking photos and the like characterized by the fact that it is constituted of a carrying skeleton defining an inner space of parabolic cross section having a base rectangular frame and which is formed of members which are articulated to each other and of members which can be connected to each other by disengageable means so that the skeleton components can be partly disassembled and partly folded so as to occupy a minimum space or according to an opposite sequence of operations can be brought in their use position, and of an outer covering which comprises a first portion made of flexible, opaque sheet material having a white inner surface and a dark outer surface and designed to cover the parabolic surface defined by said skeleton, and a second portion made of translucent flexible material to screen the rectangular base of said skeleton and which is at least disconnectably connected with the first portion along their edges, said base frame comprising two side rods and cross members, near the ends of said longitudinal rods of the rectangular frame and at least on one intermediate point first fittings being provided to disassemblably receive the ends of said cross members, and other fittings to disassemblably receive the ends of curved centering parabolic rods.

2. A reflecting screen according to claim 1, wherein the partly foldable and partly disassemblable skeleton is constituted of a base rectangular frame formed of two longitudinal rods made of a single piece and by three composite cross members, each formed by three sections, the central of which is disassemblably connected to the other ones which are made integral with the longitudinal rods of the said frame, a longitudinal beam positioned at a level higher than that of said longitudinal rods being carried by the ends of the longitudinal rods of the base frame by two pairs of double-hinged arms which are connected respectively to one of two sliders slidely mounted on said beam, each of said arms being formed of three sections, articulated to each other, the upper end sections being integral with the corresponding slider and rod lower end sections being integral with said rod ends, while the axes of the hinges connecting the adjacent arm sections are so positioned as to allow said sections to be arranged either in their aligned relationship or in such a manner that their central sections become substantially parallel to the beam and to the rods after the sliders being duly slided along said upper beam approaching the centre of said beam, stop means being provided adapted to define the alignment position of the three sections of each composite arm.

3. A reflecting screen according to claim 1, wherein the connections between the curved rods and the fittings made integral with the longitudinal rods of the base frame and those of the central sections of the cross members with the rods are constituted of joints inclunding guiding means arranged in the end sections and a row of notches arranged in the ends of the disassemblable central section of the cross member or the disassemblable curved rods and co-operating with spring locking means, manually releasable, thus enabling the sliding and the locking of said central sections until the desired position of the rods with respect of the end sections thereof fixedly connected to the longitudinal rods.

4. A reflecting screen according to claim 1, wherein said first portion of said covering is so shaped as to entirely cover the parabolic outer surface defined by the skeleton, while the second portion which is designed to screen the rectangular base of said skeleton is flexible opaline or translucent and is fixedly connected along one longitudinal edge to the preceding part, while along the other edges openable closure means are provided.

5. A reflecting screen according to claim 4, wherein said openable closure means comprise zipper means.

* * * * *